(12) United States Patent
Flores et al.

(10) Patent No.: US 7,557,709 B2
(45) Date of Patent: Jul. 7, 2009

(54) ITEM TRACKING SYSTEM

(75) Inventors: Eduardo Ruiz Esparza Flores, San Pedro Garza Garcia (MX); Jose Adalberto Teran Matus, San Pedro Garza Garcia (MX); Rafael Guillermo Ramos Elizondo, Monterrey (MX); Patricio Gerardo Trevino Ramirez, San Pedro Garza Garcia (MX)

(73) Assignee: RFID Mexico, S.A. DE C.V., San Pedro Graza Garcia (MX)

( * ) Notice: Subject to any disclaimer, the term of this patent is extended or adjusted under 35 U.S.C. 154(b) by 172 days.

(21) Appl. No.: 11/580,006

(22) Filed: Oct. 13, 2006

(65) Prior Publication Data

US 2008/0088447 A1 Apr. 17, 2008

(51) Int. Cl.
*G08B 13/14* (2006.01)
(52) U.S. Cl. ............... 340/572.1; 340/10.33; 340/572.9
(58) Field of Classification Search ............. 340/10.33, 340/10.42, 10.5, 10.1, 10.52, 572.1–572.9
See application file for complete search history.

(56) References Cited

U.S. PATENT DOCUMENTS

| 4,473,373 | A | * | 9/1984 | Weiss | 8/137 |
| 6,317,044 | B1 | * | 11/2001 | Maloney | 340/568.1 |
| 6,427,913 | B1 | * | 8/2002 | Maloney | 235/383 |
| 6,662,078 | B1 | * | 12/2003 | Hardgrave et al. | 700/226 |
| 6,989,749 | B2 | | 1/2006 | Mohr | |
| 7,180,420 | B2 | * | 2/2007 | Maurer | 340/572.1 |
| 7,221,276 | B2 | * | 5/2007 | Olsen et al. | 340/572.1 |
| 7,250,865 | B2 | * | 7/2007 | Maloney | 340/572.1 |
| 2008/0059338 | A1 | | 3/2008 | Hubbard | |

* cited by examiner

*Primary Examiner*—Benjamin C Lee
*Assistant Examiner*—Daniel Previl
(74) *Attorney, Agent, or Firm*—Young & Thompson

(57) ABSTRACT

An item tracking system using RFID technology for automatically monitoring the taking and returning operations of items from a storage location inside a working area provides an "on line" status of each tool as well as a usage history of each tool. Furthermore, the system knows which item has been taken or stored from which storage area by which worker and when.

20 Claims, 2 Drawing Sheets

ITEM TRACKING SYSTEM

BACKGROUND OF THE INVENTION

A. Field of the Invention

The present invention is related to systems for tracking items inside a predetermined area and more particularly to an item tracking system for controlling the lending and returning of items assigned to predetermined storing locations inside a working area by the workers.

B. Description of the Related Art

In certain working places such as aeronautics workshops, it is critical to keep an extremely clean and safe environment, since any object, even small ones, can get lost and end inside an engine for example, which can be disastrous during testing or operation of the engine, destroying the engine and causing a serious problem in the aircraft during flight.

The above referred problem gets worst in a workshop where many tools and instruments are used by many people for maintenance operations and where the tools can eventually get lost and become a FOD (Foreign Object Damage).

When a tool gets lost, it is necessary to stop all the operations in the workshop until the tool is found, if it is even found, causing serious problems and delays in the workshop and serious problems to the aircraft operator which lost precious time and money, not mentioning the risk of delivering an aircraft with a potential fatal problem.

In view of the above, some fraudulent practices may arise when a tool gets lost, such as some worker stealing the tools of another worker to replace his/her lost tool and link the responsibility of the problem to another person, or even buy a replacement tool from internal fraudulent organizations or from an external provider, which involves a great risk since the lost tool may cause a fatal accident.

In order to solve this problem, there were developed methods and systems comprising the use of ID (identification) tags comprising a bar code sticker for each tool and manually tracking each tool frequently. This system requires that when a worker takes a tool from a location the tool be passed in front of a bar code reader for registering the transaction and the same operation should be done for returning the tool to the storage location which is time consuming and it may be possible that a worker forget to register the taking and/or returning operations in the system which may cause very serious control problems since it may generate a false alarm if a tool is not registered as "returned".

Furthermore, the bar code sticker may be peeled of from the tools during use, thus turning the sticker rests in potentially dangerous FOD's.

In view of the above referred problems, applicant developed a system which makes use RFID technology for automatically monitoring the taking and returning operations of items inside a working area.

The present inventive system comprises: a plurality of electronic worker identification tags, each worker identification tag assigned to a respective worker, each worker identification tag having personalized identification information about the worker; a plurality of electronic item identification tags, each electronic item identification tag permanently integrated to a respective tool, each electronic item identification tag having information about the item and about the item's assigned storage area; a plurality of electronic worker identification tags readers for each storage area; a plurality of electronic item identification tags readers for each storage area; a control system connected to each electronic worker identification tags readers and to each electronic item identification tags reader, the control system having: memory means containing information related to: transaction information about taking and returning item operations, comprising: information about items that have been taken from the item's respective storage area by a worker on a specific time and date; information about tools that have been taken and returned to the tool's respective storage area by a worker on a specific time and date; wherein the electronic worker identification tags reader, reads a worker ID when the ID is in the reading range thereof and sends the information of the worker to the central control system; wherein the electronic item identification tags reader senses when an item is been taken from the item's respective storage area by a worker and reads the information recorded in the item ID, sends the information to the central control system which register the taking transaction in the memory means so that the system "knows" which item has been taken from which storage area by which worker and when; and wherein the electronic tool identification tags reader senses when an item is been returned to the item's respective storage area and reads the information recorded in the tool ID, sends the information to the central control system which register the storing transaction in the memory means so that the system "knows" which item that has been previously taken by a worker has been returned to its respective storage area and when.

With the present inventive system it is possible to have a tight control over each tool and an immediate control over taking and returning operations. Furthermore, the present inventive system provides an almost "on line" status of each tool as well as the usage history of each tool.

Since the system links each operation with a respective worker, it is impossible to lose any tool and returning a different tool, since the system would detect that the tool is related to other employee. A skilled in the art may suggest that the RFID tag may be easily retired from the tool and attached to other tool, but applicant's system requires that each RFID tag be attached to the tool by means of special substances already available in the market which practically "integrates" the RFID tag in such way that if someone try to detach it from the toll, the RFID is destroyed, thus avoiding fraudulent practices.

SUMMARY OF THE INVENTION

Figure 1:
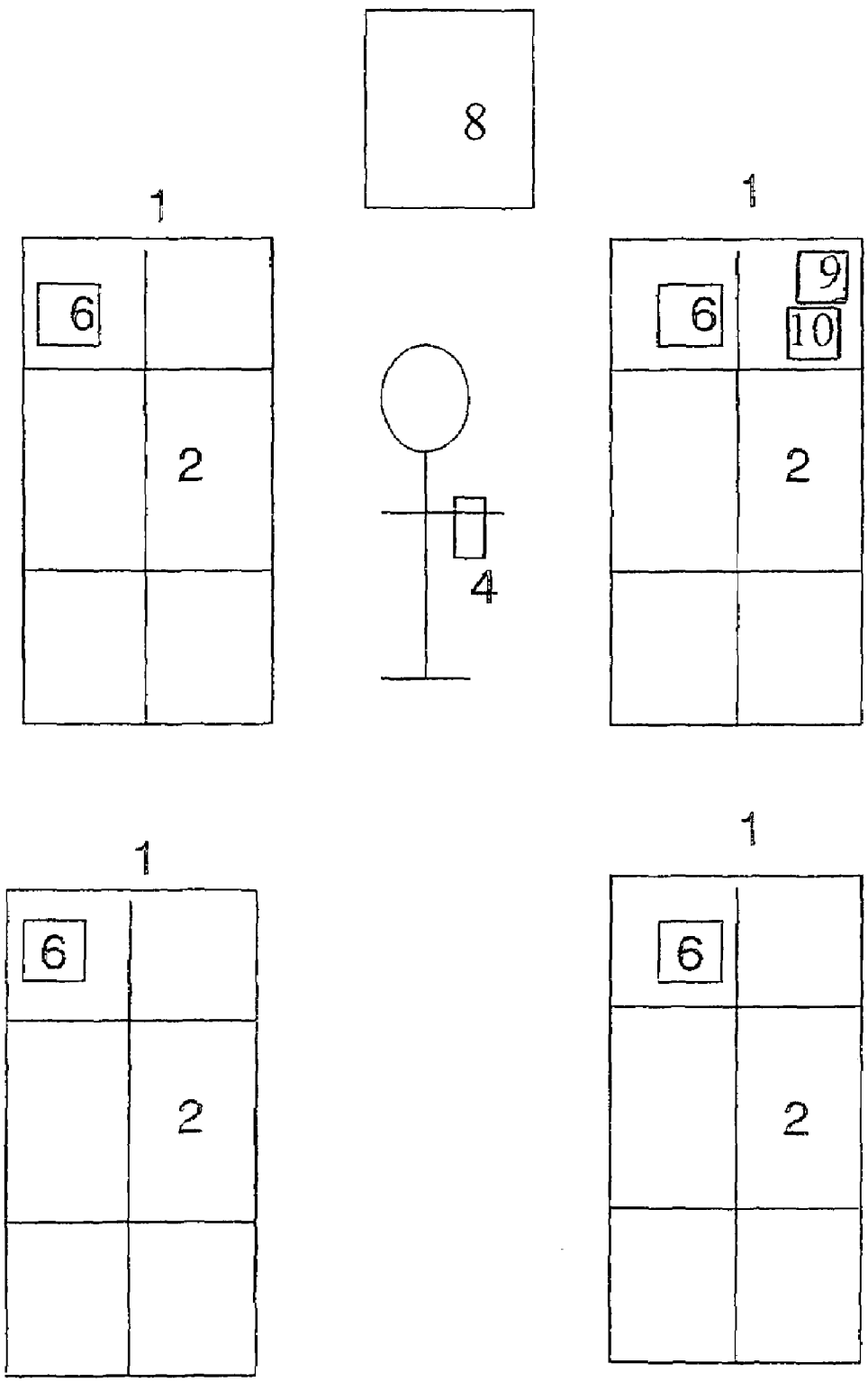
FIG. 1 is an overview of the inventive item tracking system with plural toolboxes.
Figure 2:
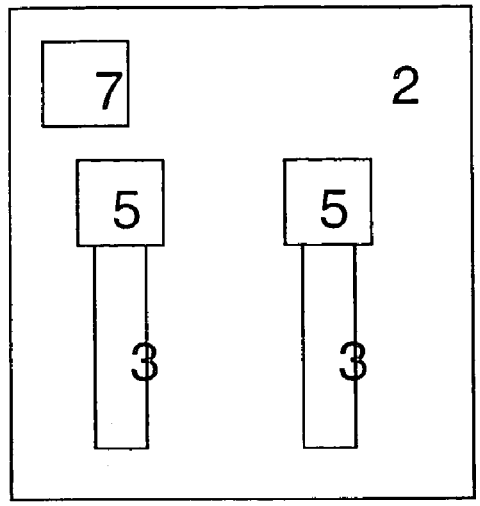
FIG. 2 is a view of the compartments of a toolbox of the inventive item tracking system.
Figure 2:
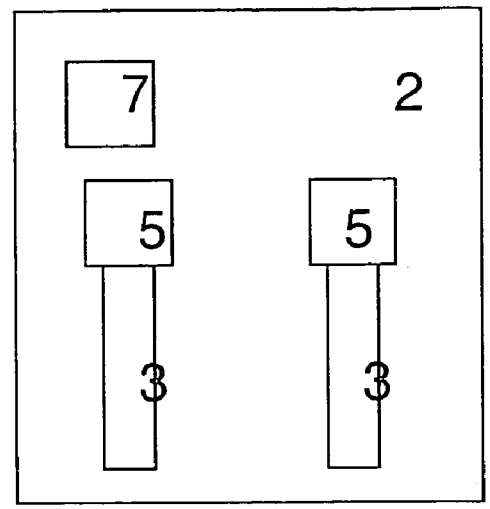
Figure 2:
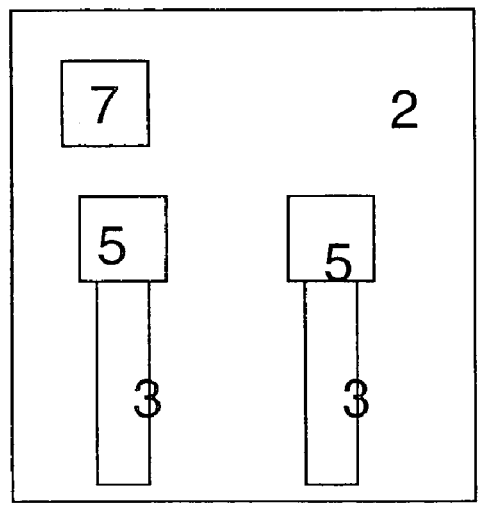
Figure 2:
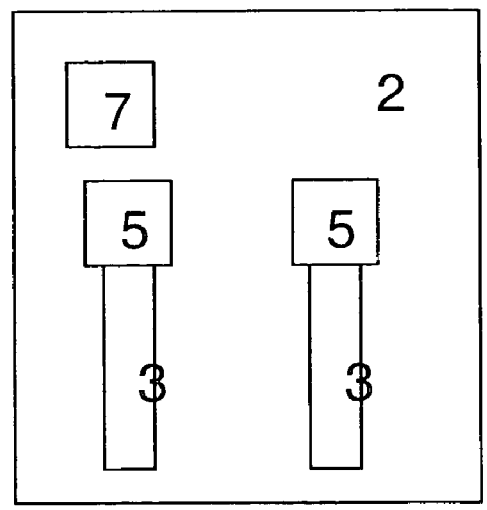

It is therefore a main object of the present invention to provide an item tracking system which makes use RFID technology for automatically monitoring the taking and returning operations of items from a storage location inside a working area.

It is another main object of the present invention to provide an item tracking system of the above referred nature which allows to have an almost "on line" status of each tool as well as the using history of each tool.

It is a further object of the present invention to provide an item tracking system of the above referred nature, which links each operation with a respective worker, thus maintaining a register of which tools are being used by each worker.

It is an additional object of the present invention to provide an item tracking system of the above referred nature which avoids that a worker returns any tool not corresponding to the tool the system registered as originally taken by the worker.

These and other objects and advantages of the physical inventory auditor system of the present invention will become apparent to those persons having an ordinary skill in the art, from the following detailed description of the embodiments of the invention which will be made with reference to the accompanying drawings.

DETAILED DESCRIPTION OF THE INVENTION

The item tracking system of the present invention will be described making reference to the accompanying drawings and to a preferred embodiment thereof and to the accompanying drawings.

In a preferred embodiment, the item tracking system of the present invention is used in a workshop having a plurality of toolboxes 1 each having a plurality of compartments 2, each compartment including one or more corresponding tools 3, wherein the item tracking system of the present invention comprising:

a plurality of toolboxes 1, each toolbox having automatic locking and unlocking means 9 for each compartment 2 controlled by an electronic system 10;

a plurality of RFID worker identification tags 4, each RFID worker identification tag assigned to a respective worker, each RFID worker identification tag having personalized identification information recorded thereon such as name, worker ID, and working area and privileges;

a plurality of RFID tool identification tags 5, each RFID tool identification tag assigned to a respective tool 3, each RFID tool identification tag having the following information recorded thereon: tool ID, toolbox compartment ID to which that tool is assigned, and toolbox ID to which that tool is assigned;

a plurality of RFID worker identification tags readers 6 for each toolbox compartment of a respective toolbox;

a plurality of RFID tool identification tag readers 7, each RFID tool identification tag reader assigned to a respective compartment 2 of a respective toolbox 1;

a control system 8 connected to the electronic control means of each tool box 1, to each RFID worker identification tags readers 6 and to each RFID tool identification tag reader 7 having:

memory means containing information related to:
description of each tool, so that each tool ID is related to a respective description information;
information of each worker, so that each worker ID is related to respective personnel information;
privilege information for each worker, for establishing which compartments of a respective toolbox a worker may have access and took a tool from, so that each worker ID has a plurality of toolbox ID and toolbox compartment ID to which the worker may have access;
tools assigned to each compartment of a respective toolbox, in such way that each tool ID is related to one compartment ID and respective toolbox ID;
historic information about the use of each tool by the workers, so that each tool ID is related to a plurality of tool ID and specific times and dates;
transaction information about taking and returning tool operations, comprising:
information about tools that have been taken from its respective compartment by a worker on a specific time and date, comprising tools ID related to a worker ID, and to a specific time and date in which the tool was taken and to an "in use" status
information about tools that have been taken and returned to its respective compartment by a worker on a specific time and date comprising tools ID related to a worker ID, and to a specific time and date in which the tool was returned and to a "returned" status.

wherein the RFID worker identification tags reader 6, reads a worker ID 4 when the ID 4 is in the reading range thereof, sends the information of the worker to the central control system 8 and the control system 8 sends a signal to the electronic control system of the respective toolbox 1 for unlocking one or more compartments 2 based on the worker privilege information;

wherein the RFID tool identification tag reader 7 senses when a tool 3 is been taken from its respective compartment and reads the information recorded in the tool ID 5, sends the information and identification information about the involved toolbox 1 to the central control system 8 which register the taking transaction in the memory means so that the system "knows" which tool 3 has been taken by which worker and from which toolbox 1 and compartment 2 at what time and date; and wherein the RFID tool identification tag readers senses when a tool 3 is been returned to its respective compartment 2 and reads the information recorded in the tool ID 3, sends the information to the central control system 8 which register the storing transaction in the memory means so that the system "knows" which tool that has been previously taken by a worker has been returned to its respective compartment 2.

Each RFID tool identification tag 5 is permanently joined to a respective tool by means of an adherent substance, so that if someone tries to detach the tag, the tag is destroyed.

In addition to the control over the taking and returning transactions for each tool 3, the present inventive system may alert the administrator of the system about many irregular occurrences, such as a worker trying to return a tool 3 which is not registered in the system or which was taken by another person.

Additionally, the system may be programmed to assign a certain period of time to a worker for returning a specific tool 3, so that if a worker fails to return the tool during the period of time, the system may alarm the administrator.

The disclosed item tracking system is for use in working areas (workshops) that include a plurality of storage areas (e.g., toolboxes 1) for storing a plurality of items (e.g., tools 3) which are taken and returned by a plurality of workers. In the system an electronic worker identification tag 4 is assigned to each respective worker. The worker identification tags 4 each having personalized identification information about the respective workers. Additionally, an electronic item identification tag 5 is permanently integrated to each tool 3 in such way it is necessary to destroy the identification tag 5 for removing the tag 5 from the tool 3. Each tag 5 has information about the tool 3 and about the tool's assigned storage area and may be an RFID identification tag.

There is an electronic worker identification tag reader 6 for each storage area (toolbox 1). There is also one or more electronic item identification tag readers 7 for each storage area. A control system 8 is connected to each electronic worker identification tag reader 6 and to each electronic item identification tag reader 7.

Each storage area (1) has one or more storage cells (e.g., compartments 2), each storage cell 2 further includes automatic electronic locking and unlocking means controlled by an electronic control system. Each storage cell 2 further has an assigned item identification tag reader.

The control system 8 includes memory means with privilege information for each worker, the privilege information for establishing which storage cell of a respective storage area a worker may have access and took an item. The electronic worker identification reader 6 reads a worker ID 4 when the ID 4 is in the reading range thereof, and sends the information of the worker to the control system 8 and the control system 8 sends a signal to the electronic control system of the respective storage cell for unlocking one or more storage cells based on the worker privilege information.

Although in the above referred embodiments, the inventive system was described as been used for a workshop, the inventive may be used for any place in which it is necessary to track items inside a working area, for example in a hospital, where it is necessary to have a control over controlled medications which recipients are not emptied at once.

Finally it must be understood that the item tracking system of the present invention, is not limited exclusively to the embodiments above described and illustrated and that the persons having ordinary skill in the art can, with the teaching provided by the invention, to make modifications to the item tracking system of the present invention, which will clearly be within of the true inventive concept and of the scope of the invention which is claimed in the following claims.

What is claimed is:

1. An item tracking system for using in working areas including a plurality of storage areas for storing a plurality of items which are taken and returned by a plurality of workers, said item tracking system comprising:
   one or more electronic worker identification tags, each assigned to a respective worker, each electronic worker identification tags having personalized identification information about the worker;
   one or more electronic item identification tags, each electronic item identification tags permanently integrated to a respective item in such way removing the electronic item identification tag from the item destroys the electronic item identification tag, each electronic item identification tag having information about the item and about item's assigned storage area;
   one electronic worker identification tags reader for each storage area;
   one or more of electronic item identification tags readers for each storage area;
   a control system connected to each electronic worker identification tags reader and to each electronic item identification tags reader, the control system having:
   memory means containing information related to:
   transaction information about taking and returning item operations, the transaction information comprising:
   information about items that have been taken from the items' respective storage area by a worker on a specific time and date;
   information about further items that have been taken and returned to the further items' respective storage area by a worker on a specific time and date;
   wherein the electronic worker identification tags reader reads the personalized identification information from the electronic worker identification tag of a first worker when the electronic worker identification tag of the first worker is in the reading range thereof and sends the read worker information to the control system;
   wherein the electronic item identification tags reader senses when an item is being taken from the item's respective storage area by a worker and reads the information recorded in the electronic item identification tags, sends the read item information to the control system to register the taking transaction in the memory means by the system recording in data storage which item has been taken from which storage area by which worker and when;
   wherein one of the electronic item identification tags readers of the respective storage area senses when an item is been returned to the respective storage area and reads the information recorded in the tool's electronic item identification tag, sends the information to the control system which register the storing transaction in the memory means by the system recording in data storage which item that has been previously taken by a worker has been returned to the respective storage area and when; and
   wherein the electronic worker identification tags reader of the respective storage area reading the electronic worker identification tags and the electronic item identification tags readers of the respective storage area reading the electronic item identification tags as the worker removes each item from the respective storage area and as the same worker returns each item to the respective storage area, the memory means maintains the information of the same worker removing and subsequently returning each item to the respective storage area.

2. An item tracking system as claimed in claim 1, wherein each electronic identification tag comprises an RFID identification tag.

3. An item tracking system as claimed in claim 1, wherein,
   each storage area comprises one or more storage cells,
   each storage cell comprises automatic locking and unlocking means controlled by an electronic system,
   the control system is connected to the locking and unlocking means of each storage cell;
   the memory means of the control system further includes privilege information for each worker, the privilege information for establishing which storage cell of a respective storage area a worker may have access and took an item from; and
   the electronic worker identification tags reader reads the electronic worker identification tag when the electronic worker identification tag is in the reading range thereof, sends the information of the worker to the control system and the control system sends a signal to the locking and unlocking means of the respective storage cell for unlocking one or more storage cells based on the worker privilege information.

4. An item tracking system as claimed in claim 1 wherein the memory means of the control system further including:
   information about the description of each item;
   information about each worker;
   information about which items are assigned to each storage area; and
   historic information about the use of each item by the workers.

5. An item tracking system as claimed in claim 1, wherein each storage area has one or more storage cells, each storage cell having one or more item identification tags readers, each storage cell further including automatic locking and unlocking means controlled by an electronic system;
   wherein the central control system is connected to the locking and unlocking means of each storage cell;
   wherein the control system is connected to the item identification tags readers of each cell of each storage area;
   wherein the memory means of the control system further including privilege information for each worker, for establishing which storage cell of a respective storage area a worker may have access and took an item from;
   wherein the electronic worker ID reading means, reads a worker ID when the ID is in the reading range thereof, sends the information of the worker to the control system and the control system sends a signal to the locking and unlocking means of the respective storage cell for unlocking one or more storage cells based on the worker privilege information;

wherein the electronic worker ID reading means, reads a worker ID when the ID is in the reading range thereof and sends the information of the worker to the control system;

wherein the electronic item ID reading means senses when an item is been taken from its respective storage cell of a respective working area by a worker and reads the information recorded in the item ID, sends the information to the control system which register the taking transaction in the memory means by the system recording in data storage which item has been taken from which storage cell of a respective storage area by which worker and when; and wherein the electronic tool ID reading means senses when an item is been returned to its respective storage cell and reads the information recorded in the tool ID, sends the information to the control system which register the storing transaction in the memory means by the system recording in data storage which item that has been previously taken by a worker has been returned to its respective storage cell of a respective storage area and when.

6. An item tracking system method comprising the steps of:

providing one or more electronic worker identification tags, each assigned to a respective worker, each having personalized identification information about the worker; one or more electronic item identification tags, each permanently integrated to a respective tool, each electronic item identification tag having information about the tool and about the tool's assigned storage area; one or more electronic worker identification tags readers for each storage area; one or more electronic item identification tag readers for each storage area; a central control system connected to each electronic worker identification tag readers and to each electronic item identification tag reader having: memory means containing information related to: transaction information about taking and returning tool operations, comprising: information about tools that have been taken from the tool's respective storage area by a worker on a specific time and date; information about tools that have been taken and returned to the tool's respective storage area by a worker on a specific time and date;

reading a worker ID by means of the electronic worker identification tag readers, and sending the information of the worker to the central control system for registering;

sensing when a tool is being taken from the tool's respective storage area by a worker and reading the information recorded in the item identification tag by means of the item identification tag readers, sending the information to the control system which register the taking transaction in the memory means by the system recording in data storage which tool has been taken from which storage area by which worker and when; and sensing when a tool is being returned to the tool's respective storage area and reading the information recorded in the item identification tag by means of the item identification tag readers, sending the information to the control system which registers the storing transaction in the memory means by the system recording which tool that has been previously taken by a worker has been returned to the tool's respective storage area and when.

7. A method as claimed in claim 6, comprising the step of providing electronic identification tags comprising RFID identification tags.

8. A method as claimed in claim 6, wherein each storage area having one or more storage cells, the method further comprising:

providing each cell with automatic locking and unlocking means controlled by an electronic system and connecting each electronic means of each storage cell to the central control system and further providing the memory means of the central control system with privilege information for each worker, for establishing which storage cell of a respective storage area a worker may have access and authorization to take a tool from; and reading a worker ID by means of the electronic worker identification tag readers, sending the information of the worker to the control system for unlocking one or more storage cells of a respective storage area based on the worker privilege information.

9. A method as claimed by claim 6 comprising further providing the memory means of the central control system with: information about the description of each tool; information about each worker; information about which tools are assigned to each storage area; and historic information about the use of each tool by the workers.

10. A method as claimed by claim 6 wherein each storage area having one or more storage cells, the method further comprising:

assigning each storage cell with one of the item identification tag readers;

providing each cell with automatic locking and unlocking means controlled by an electronic system and connecting each electronic means of each storage cell to the control system and further providing the memory means of the control system with privilege information for each worker, for establishing which storage cell of a respective storage area a worker may have access and authorization to take a tool from; and reading a worker ID by means of the electronic worker identification tag readers, sending the information of the worker to the control system for unlocking one or more storage cells of a respective storage area based on the worker privilege information;

reading a worker ID by means of the electronic worker identification tag readers, and sending the information of the worker to the control system for registering;

sensing when a tool is being taken from the tool's respective storage cell of a respective storage area by a worker and reading the information recorded in the electronic item identification tag by means of the item identification tag readers, sending the information to the control system which register the taking transaction in the memory means by the system recording in data storage which tool has been taken from which storage cell of a respective storage area by which worker and when; and sensing when a tool is being returned to the tool's respective storage area and reading the information recorded in the item identification tags by means of the item identification tag readers, sending the information to the control system which register the storing transaction in the memory means by the system recording in data storage which tool that has been previously taken by a worker has been returned to the tool's respective storage cell of a respective storage area and when.

11. An tool tracking system, comprising:

a toolbox (1);

a first compartment (2) within the toolbox;
a first tool (5) assigned to the first compartment;
a first locking and unlocking means (9) for the first compartment;
an electronic first worker identification tag (4) having personalized identification information of a first worker and an electronic second worker tag (4) having personalized identification information of a second worker;
a first electronic tool identification tag (5) permanently integrated to the first tool in such a way that removing the tool identification tag from the first tool destroys the removed tool identification tag, the electronic tool identification tag having information about the first tool and first tool's assigned compartment and assigned toolbox;
an electronic worker identification tag reader (6) that reads the first and second worker identification tags for respectively providing the first and second workers access, as authorized, to the first compartment by, as authorized, the first locking and unlocking means (9) unlocking the first compartment;
a first tool identification tag reader (7) assigned to the first compartment for reading the first tool identification tag integrated to the first tool when the first tool is located within the first compartment, the first tool identification tag reader sensing when the first tool is being taken from the first compartment;
a control system (8) connected to i) the electronic worker identification tag reader, ii) the first tool identification tags reader, and iii) the first lock and unlocking means, the control system comprising memory means containing transaction information about tool taking and returning operations,
the transaction information comprising i) first information of the electronic worker identification tag reader (6) reading the first worker identification tag and providing the first worker access to the first compartment, and ii) second information of, when the first worker has been provided access to the first compartment, the first tool identification tag reader (7) reading the first tool identification tag and sensing that the first tool has been taken from the first compartment, including time and date information of when the first tool was taken from the first compartment by the first worker.

12. The tool tracking system of claim 11, further comprising:
a second compartment (2) within the toolbox;
a first set of tools (5) assigned to the first compartment, the first set of tools comprising the first tool and a second tool;
a second set of tools (5) assigned to the second compartment, the second set of tools comprising a third tool and a fourth tool;
a second locking and unlocking means (9) for the second compartment;
second, third, and fourth electronic tool identification tags (5) permanently integrated respectively to the second, third, and fourth tools in such a way that removing any tool identification tag from the corresponding tool destroys the removed tool identification tag, each electronic tool identification tag having information about the corresponding tool and corresponding tool's assigned compartment and assigned toolbox;
the electronic worker identification tag reader (6) reading the first and second worker identification tags for respectively providing the first and second workers access, as authorized, to the first and second compartments by, as authorized, the first locking and unlocking means (9) unlocking the first compartment and the second locking and unlocking means (9) unlocking the second compartment;
the first tool identification tag reader (7) assigned to the first compartment for reading the first and second tool identification tags integrated to respectively the first and second tools when the first and second tools are located within the first compartment, the first tool identification tag reader sensing when the first tool is being taken from the first compartment and sensing when the second tool is being taken from the first compartment;
a second tool identification tag reader (7) assigned to the second compartment for reading the third and fourth tool identification tags integrated to respectively the third and fourth tools when the third and fourth tools are located within the second compartment, the second tool identification tag reader sensing when the third tool is being taken from the second compartment and sensing when the fourth tool is being taken from the second compartment;
the control system (8) connected to i) the electronic worker identification tag reader, ii) the first and second tool identification tags readers, and iii) the first and second lock and unlocking means,
the transaction information comprising i) first information of the electronic worker identification tag reader (6) reading the first worker identification tag and providing the first worker access to the first compartment, and ii) second information of, when the first worker has been provided access to the first compartment, the first tool identification tag reader (7) reading the first and second tool identification tags and sensing that the first tool has been taken from the first compartment and sensing the second tool has been taken from the first compartment by the first worker, including time and date information of when the first and second tools were taken from the first compartment by the first worker,
the transaction information further comprising i) third information of the electronic worker identification tag reader (6) reading the second worker identification tag and providing the second worker access to the second compartment, and ii) fourth information of, when the second worker has been provided access to the second compartment, the second tool identification tag reader (7) reading the third and fourth tool identification tags and sensing that the third tool has been taken from the second compartment and sensing when the fourth tool has been taken from the second compartment by the second worker, including time and date information of when the third and fourth tools were taken from the second compartment by the second worker,
the transaction information still further comprising i) fifth information of, the second worker having been provided further access to the second compartment, the second tool identification tag reader (7) further reading the third and fourth tool identification tags and further sensing when, by time and date, the third tool has been returned to the second compartment and sensing when, by time and date, the fourth tool has been returned to the second compartment by the second worker.

13. An item tracking system as claimed in claim 12, wherein each electronic tool identification tag (5) comprises an RFID identification tag.

14. An item tracking system as claimed in claim 13, wherein each electronic worker identification tag (4) comprises an RFID identification tag.

15. An tool tracking system as claimed in claim 12, further comprising:
   another toolbox (1);
   a first compartment (2) within the another toolbox;
   a second compartment (2) within the another toolbox;
   a third set of tools (5) assigned to the first compartment of the another toolbox and comprising fifth and sixth tools;
   a fourth set of tools (5) assigned to the second compartment of the another toolbox and comprising seventh and eighth tools;
   a third locking and unlocking means (9) for the first compartment of the another toolbox;
   a fourth locking and unlocking means (9) for the second compartment of the another toolbox;
   fifth, sixth, seventh, and eight electronic tool identification tags (5) permanently integrated respectively to the fifth, sixth, seventh, and eight tools in such a way that removing any tool identification tag from the corresponding tool destroys the removed tool identification tag, each electronic tool identification tag having information about the corresponding tool and corresponding tool's assigned compartment and the corresponding tool's assigned toolbox.

16. An item tracking system as claimed in claim 12, the control system issues an alert of the first worker returning one of the tools to one of the compartments without the transaction information indicated the first worker having removed the one tool from the one compartment.

17. An item tracking system as claimed in claim 16, the control system issues the alert of the first worker returning one of the tools to one of the compartments without the transaction information indicated the first worker having removed the one tool from the one compartment, and the alert indicates that the returned one tool was taken from the one compartment by the second worker.

18. An item tracking system as claimed in claim 12, the control system issues an alert of the first worker returning any tool not registered with the system to one of the compartments.

19. An item tracking system as claimed in claim 12, wherein,
   plural of said first tool identification tag reader are assigned to the first compartment for reading any tool identification tags within the first compartment, and
   plural of said second tool identification tag reader are assigned to the second compartment for reading any tool identification tags within the second compartment.

20. An item tracking system as claimed in claim 11, wherein upon the first tool being removed from the first compartment, the control system monitors an elapsed time of the first tool being out of the first compartment of the first toolbox, the monitored elapsed time being an input to trigger an alert concerning the first tool being removed from the first compartment for more than a pre-established time.

* * * * *